UNITED STATES PATENT OFFICE.

JOSEPH B. WILSON, OF TOWNSEND'S INLET, NEW JERSEY, ASSIGNOR TO HIMSELF AND WILLIAM A. BARRETT, OF PHILADELPHIA, PA.

IMPROVEMENT IN FERTILIZING SOILS.

Specification forming part of Letters Patent No. 143,213, dated September 23, 1873; application filed August 12, 1873.

*To all whom it may concern:*

Be it known that I, JOSEPH B. WILSON, of Townsend's Inlet, Cape May county, State of New Jersey, have invented an Improvement in Fertilizing Soils, of which the following is a specification:

I have ascertained by practical tests that pulverized anthracite coal forms an excellent basis for manure. I have applied it, for instance, to the sandy loam of Cape May county, New Jersey, on land planted with potatoes, and the result has been an extraordinary yield compared with that of similar crops grown in the same neighborhood in soil which has been manured in the ordinary manner. In this case I used about ten per cent. of lime with the coal, but this proportion may be varied in accordance with the character of the soil and of the crops to which the manure has been applied. I have found that the pulverized coal has a tendency to maintain the soil to which it has been applied in a moist condition, for, in comparing the soil over which the coal-dust has been thinly scattered with adjacent soil which has received no such treatment, the latter has become perfectly dry after a shower, while the soil on which the coal-dust has been scattered remained quite moist.

Whatever inherent fertilizing qualities the coal may have when first applied, this property of maintaining the soil in a moist condition facilitates the fertilizing effect of any manure which may be combined with the coal. I have applied coal-dust combined with fish-manure to corn-crops with the best results; in fact, it may be employed with guano, phosphates, and other fertilizing agents, and may be applied to the soil in the same manner as other fertilizers.

Where insects prevail it is advisable to saturate the pulverized coal with a weak solution of saltpeter in water, which is so obnoxious to the insects as to effectually prevent their ravages on your plants.

I claim as my invention—

As an improvement in fertilizing the soil, applying to the same crude pulverized mineral coal, with or without manure ingredients, as herein set forth.

In testimony whereof I have signed my name to this specification in the presence of two subscribing witnesses.

JOSEPH B. WILSON.

Witnesses:
HARRY SMITH,
HUBERT HOWSON.